Sept. 12, 1961  O. K. KELLEY  2,999,400
HYDRODYNAMIC TORQUE CONVERTERS AND CONTROLS THEREFOR
Filed Jan. 13, 1954  2 Sheets-Sheet 1
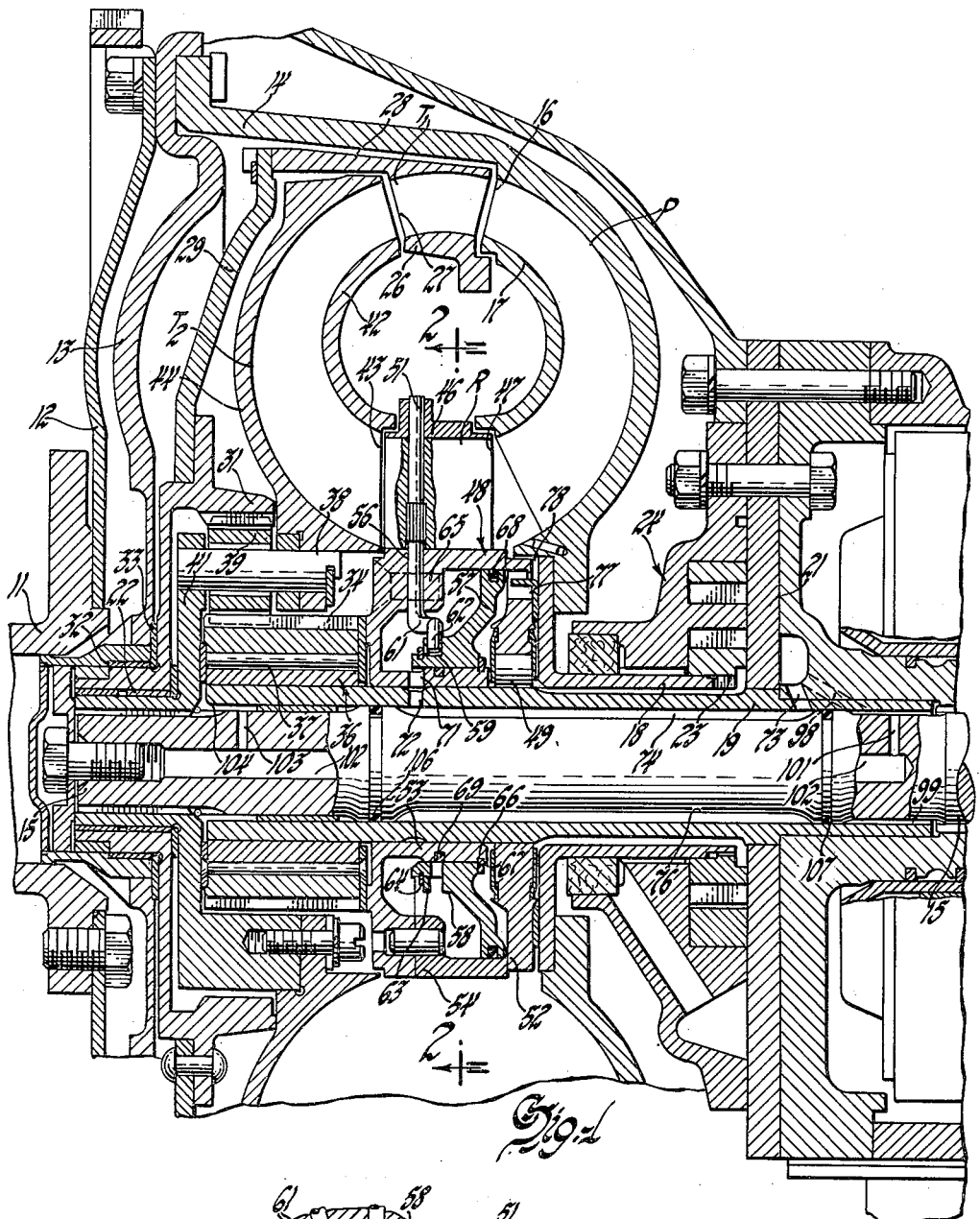
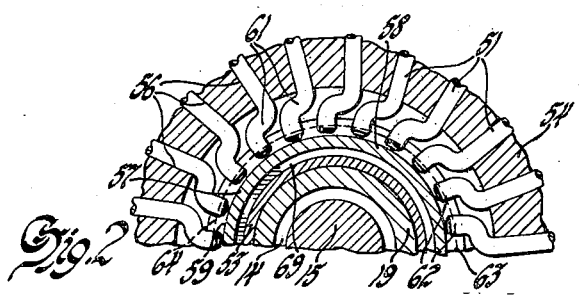
INVENTOR
Oliver K. Kelley
BY
T. L. Chisholm
ATTORNEY INVENTOR
Oliver K. Kelley
BY
T. L. Chisholm
ATTORNEY United States Patent Office 2,999,400
Patented Sept. 12, 1961

2,999,400
HYDRODYNAMIC TORQUE CONVERTERS AND CONTROLS THEREFOR
Oliver K. Kelley, Birmingham, Mich., assignor to General Motors Corporation, Detroit, Mich., a corporation of Delaware
Filed Jan. 13, 1954, Ser. No. 403,813
16 Claims. (Cl. 74—645)

This invention relates to hydrodynamic torque converters and especially to such devices adapted to be used in the transmission of motor vehicles and in other installations wherein the particular properties thereof can be advantageously employed.

In transmitting power through a fluid torque converter having a free-wheeling reaction member, it is well known that the converter in normal operation passes progressively from a torque multiplying phase there is usually a considerable rotative differential between the converter impeller and turbine members and, due to the load on the turbine member, the kinetic energy of the fluid circulated by the impeller is not entirely utilized in driving the turbine. Reaction blades are interposed in the converter circuit to redirect the energized fluid as it leaves the turbine so that it supplements the driving action of the impeller and in this way, in effect multiples the driving torque until the turbine member approaches the rotative speed of the impeller. The reaction blades are mounted in a structure which is stationary during the torque multiplying phase, (being held against reverse rotation by a one-way brake) and is, therefore, called a stator. As the speed of the impeller and turbine members approach 1:1, increasingly less torque multiplication is necessary and the utility of the stator member gradually diminishes, until finally it rotates in the same direction as the impeller and turbine members.

When maximum torque multiplication is required, as during rapid acceleration, it is desirable to have the reactor or stator blades at a high angle in order to have a maximum redirection of fluid leaving the turbine and entering the impeller, while during normal acceleration, or while the converter is functioning as a fluid coupling, it is more efficient if the stator blades define a relatively low angle.

Thus, heretofore, in most commercial fluid torque converters, the optimum blade angle for maximum torque multiplication and the optimum blade angle for maximum coupling efficiency have been compromised and the blading fixed at an angle between the optimums to achieve the most satisfactory average performance. By this performance rationalization neither maximum torque multiplication nor maximum coupling efficiency has been realized.

The reference to the high and low angle positions of the stator blading is as compared to an axial blade which has zero angle, the blade angle in each case being measurable between the axis of rotation of the torque converter and the principal chordal plane of the reaction blade.

In the present invention, the disadvantage of "average performance" is overcome by providing a unique type of stator in which the blades can be angularly adjusted during operation to effectuate the optimum angle for the type of performance desired. If, for instance, the present torque converter is utilized in a road vehicle and the vehicle is normally accelerated or is underway at substantially constant speed, then the stator is adjusted to a low angle position for maximum coupling efficiency. If, on the other hand, it is desired to obtain maximum torque multiplication for rapid acceleration, then the stator is adjusted to a high angle position.

In the instant invention, in order to be able to vary the blade angle in accordance with the torque demanded by the operator, a hydraulic stator control mechanism has been provided which is preferably actuated, in the case of a road vehicle, in response to the engine accelerator position.

While other control variations are possible, in the embodiment of the invention disclosed for purposes of illustration the present control mechanism is so arranged that when the accelerator is moved to a position approaching or past its wide open position, the stator is moved to the high angle or high torque multiplication position, while in all other accelerator positions the stator is in the low angle position.

Thus by virtue of the present unique adjustable stator mechanism it is possible to, in effect, downshift a torque converter at any time desired to give the type of accelerative performance heretofore attributed only to step ratio type transmissions, whether manual or automatic, or to torque converters in combination with step ratio gearing in which the latter is downshifted; and yet which avoids the annoying jerking or bumping, particularly when shifting to a lower drive ratio, which accompanies drive ratio changes in the step ratio type of transmission.

While it is not necessary, the inventor has found it very satisfactory to combine his unique type of adjustable stator device with the multi-element torque converter shown in his copending application S.N. 317,951, Kelley, filed October 13, 1952 now abandoned and succeeded by continuation application Serial No. 724,204 filed March 26, 1958. In his aforementioned copending application the inventor has disclosed a torque converter in which the power transmitted through the converter is split between a pair of turbine members, one of which is directly connected to the output shaft and the other of which is connected to the output shaft through a torque muliplying device such as a planetary gearset.

In his copending application S.N. 724,204 applicant has disclosed novel torque converter blade forms which are particularly claimed therein and which blade forms are suitable to be structurally incorporated into the present invention.

A detailed description of the subject invention is set forth in the specification below.

In the drawings:

FIG. 1 is a cross sectional view through a plural element torque converter embodying the present invention.

FIG. 2 is a view substantially taken on line 2—2 of FIG. 1 with parts broken away and in section.

Figure 6:
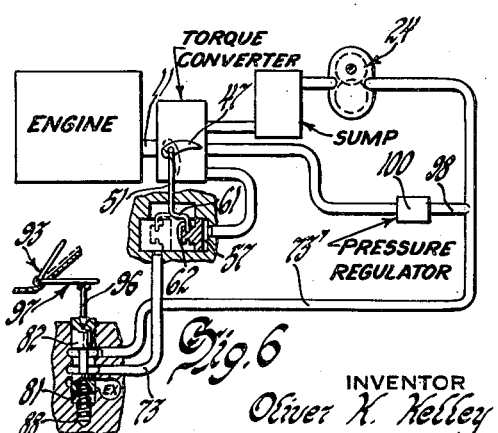
FIG. 6 is a schematic representation of the hydraulic control system for the adjustable stator mechanism.

Referring now to the drawings and particularly to FIG. 1, 11 indicates the drive shaft of some prime mover such as an internal combustion engine, schematically shown in FIG. 6, and which drive shaft has connected thereto a flywheel 12, in turn connected to the multi-part casing 13 and 14 of a hydrodynamic torque converter which drives an output shaft 15 to actuate any desired load and in any suitable fashion. In an automotive vehicle the driven shaft 15 can either constitute the propeller shaft or can be connected to drive the propeller shaft. The impeller or pump P of the converter is constructed in part of the arc shaped portion of the housing 14 and has attached thereto blades 16, to the inner edges of which are secured a core 17. The pump is supported for rotation relative to the output shaft 15 by an extension 18 which can rotate about a stationary sleeve 19 surrounding a part of the output shaft 15 and which sleeve is fixedly mounted in the web member 21 of the transmission housing. Radial bearings 22 between the flywheel and pump structure on the end of the drive shaft 15 permit relative rotation between these parts.

Pump extension 18 extends rearwardly of the torque converter and is drivingly connected to a member 23 of an oil pump 24. Since extension 18 is driven at engine speed, the output pressure of pump 24 is engine speed responsive.

The oil under pressure from pump 24 provides a continuous supply of feed oil for the torque converter as well as oil pressure for a hydraulic control system to be described below.

A first turbine T1 has a core 26, blades 27, and an outer casing or shroud 28 which extends axially forward as shown. Shroud 28 is connected by a member 29 to a ring gear 31 which is supported for rotation by radial bearings 32 and thrust bearings 33. Ring gear 31 constitutes the driving member of a planetary reduction gear set which has as the reaction member thereof a sun gear 34 rotatably supported on stationary sleeve 19. A one-way brake 36, of any suitable type, is interposed between the sun gear 34 and sleeve 19 to permit the gear to rotate in the direction of rotation of pump P and to lock the gear to the sleeve whenever the gear attempts to rotate in the opposite direction. The one-way brake 36, shown in FIG. 1, includes rollers 37. The other part of the reduction gearing comprises a planet carrier 38 having planet gears 39 mounted thereon in meshing relation with ring gear 31 and sun gear 34. An annular extension 41 of the carrier is splined directly to the output shaft 15 as shown.

A second turbine T2 is made up of a core 42, blades 43 and an outer member or shroud 44 which is secured directly to the planet carrier 38 whereby the turbine T2 rotates concurrently with output shaft 15.

The final converter member comprises a stator or reaction member R made up of a core 46 and blades 47. The blades are adjustably supported upon a hub 48 which is supported for one-way rotation upon stationary sleeve 19. A suitable one-way brake, shown at 49, is interposed between hub 48 and sleeve 19 to permit rotation of the stator member R in the direction of pump rotation but which locks the stator against rotation in the opposite direction.

The operation of the mechanism as thus far described is generally similar to that of my copending application, before identified. Rotation of the flywheel 13 drives the pump P. Liquid circulated by the pump passes first through turbine T1 causing it to rotate driving ring gear 31 and applying a driving force to the carrier 38 of the planetary gear system. The sun gear of the system is locked stationary by the one-way or free-wheeling brake 36 so that the rotation of the ring gear causes the planet gears to walk around the stationary sun gear at a reduced rate relative to the speed of rotation of the ring gear. Since the planet carrier is connected directly to turbine T2, this turbine must rotate therewith, even though the fluid leaving T1 may not be exerting forward torque on T2. Rotation of the planet carrier, as described, causes rotation of the output shaft at a reduced rate of speed relative to the first turbine. As the speed of the first turbine increases, the second turbine gradually takes on the load, until a point will be reached at which the first turbine no longer transmits torque, but rotates idly about the planet carrier causing the sun gear to free-wheel.

In my copending application S.N. 724,204 a detailed description is made of the particular blade shapes and forms also employed in the instant invention. Further, the copending application describes in detail, including vector analyses, the fluid flow forces in relation to each of the converter blade members during each phase of the converter operation, which description also applies to the instant invention, except as may be noted below. The aforementioned descriptive matter in S.N. 724,204 is incorporated by reference insofar as it is applicable to the present application.

It will be sufficient for the purposes of the present invention to briefly describe the torque converter fluid circuit which includes the toroidal flow of converter fluid through the various converter elements. As may best be seen in FIG. 1, with the vehicle initially at rest, pump P begins rotating at engine speed such that blades 16 deliver fluid to blades 27, causing T1 to rotate in the same direction but at an initially lesser speed than the pump. Fluid from T1 blades 27 during initial rotation may be directed rearwardly so that the fluid may strike the back of the blades 43 of turbine T2. If so, inasmuch as T2 is being driven forwardly through the planetary gearing, the negative fluid torque being impressed thereon is overcome by the driving effort of the first turbine member. The circulating fluid passes from blades 43 to stator blades 47, whence it is redirected to pump blades 16 so as to supplement and multiply the driving torque of pump P.

As pump P continues to accelerate, the drive load will be progressively and gradually assumed by T2. Eventually the fluid leaving blades 43 of T2 begins to strike the back sides of stator blades 47 causing the latter to freewheel in the direction of pump rotation. In this latter condition the converter is functioning as a fluid coupling with the drive being hydraulically transmitted directly from pump P to turbine T2 and hence to the output shaft 15, and T1 runs faster than the pump.

Due to the previous impracticability of controlling the angle of stator blading during converter operation it has been generally necessary in commercial type torque converters to compromise the construction and angular disposition of the stator blading and rigidly position the blades at an angle between that which would result in maximum coupling efficiency and that capable of producing maximum torque multiplication. As a result, the torque converter with fixed angles of stator blading can neither function at maximum efficiency as a fluid coupling, nor can it develop the maximum torque of which it is capable.

With the present mechanism the inventor has, on the other hand, provided a controllable stator which is both simple and certain in operation and has been proven to be commercially satisfactory. The construction and operation of the present adjustable stator and the control mechanism therefor will be described immediately hereafter.

Controllable stator

Means has been provided whereby the stator blading may be immediately and certainly shifted, depending on operator torque demand, to a first position insuring maximum coupling efficiency under normal load driving conditions or to a second position insuring maximum torque multiplication.

Figure 3:
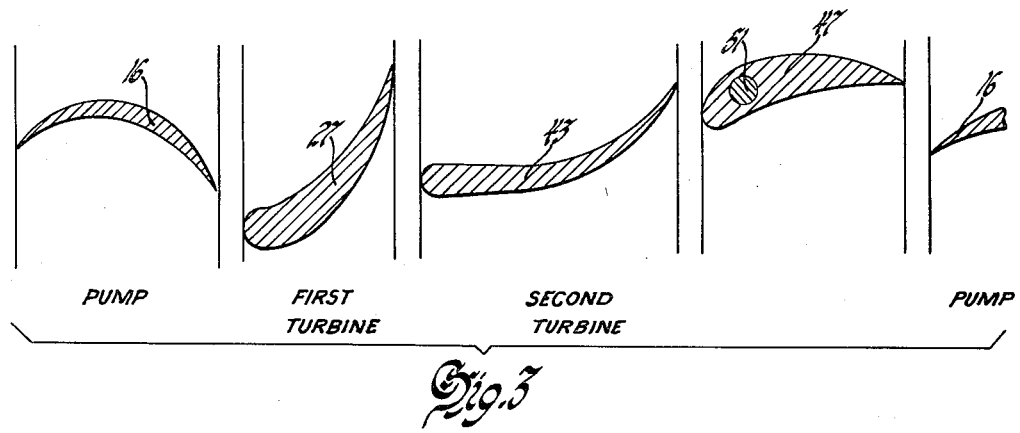
FIGS. 3 and 4 are diagrammatic representations of the blade forms and positions of the torque converter elements showing the adjustable stator in first and low angle position and second in the high angle position.
Figure 4:
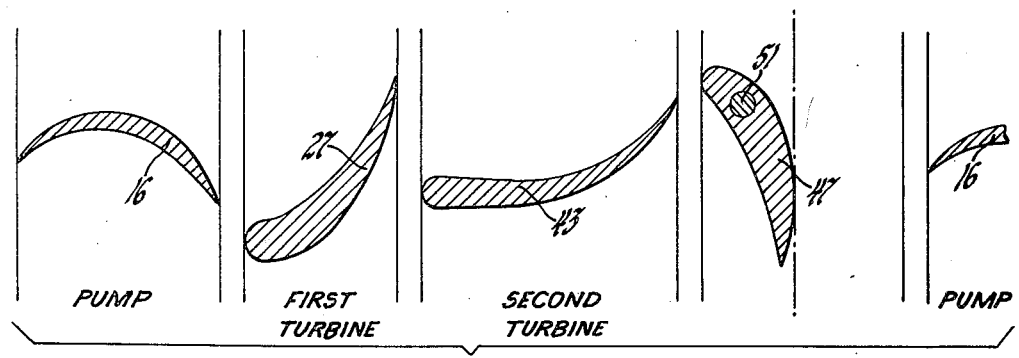

To permit the stator blades to be moved between the low and high angle positions shown in FIGS. 3, 4 and 6, each blade 47 is rigidly secured to a shaft 51. In a manner to be described below, the shaft 51 may be rotated in the hub 48 to position the stator blading. While it would be possible to make stator core 46 and hub 48 as an integral unit, it is preferable that the core and hub be made as separate units to facilitate the assembly of the stator mechanism.

Hub 48 is formed as an annular casing having a removable plate 52 at one end thereof and having radially spaced inner and outer walls 53 and 54 defining a cylinder which forms part of an operating motor or servo for the blades. Hub 48 rotatively engages stationary sleeve 19 through inner wall 53.

Means not shown is provided for rigidly attaching plate 52 to the inner and outer walls 53 and 54 of the hub casing. While it is not necessary, it has been found advantageous for sub-assembly purposes to mount the one-way stator brake 49 within the hub of plate 52.

A plurality of radially disposed passages 56 are formed through the outer servo wall 54 and within each of which passages is rotatably supported one of the blade shafts 51.

Disposed within the annular hub casing between walls 53 and 54 thereof is an annular stator piston 57 which is capable of axial and rotational movement with respect to the casing. Stator piston 57 is axially offset to provide a hub portion 58 having an end wall cooperating with member 63 (described later) to define a straight walled channel 59. The inner end of each stator shaft 51 is offset from the shaft axis to provide a crank arm 61 which terminates in a depending portion 62. Each depending portion 62 is adapted to fit within the channel 59 and to move therewith.

In order to maintain crank arms 61 in engagement with stator piston 57, a retaining ring 63, shown in FIGS. 1 and 2, is mounted on the stator hub to retain depending arm portions 62 within channel 59. An annular groove is formed in the piston hub in order to receive a locking ring 64, which may be snapped in position to hold the retaining ring and hence the depending shaft arms in position. It is, of course, obvious that a single snap ring could be employed in place of the lock and retaining rings as shown.

With the stator assembly as thus far described, it will be observed that axial movement of the piston will cause the shafts 51 to rotate and thus cause the stator blades to be moved between the positions shown in FIGS. 3 and 4. With the stator blading in the position shown in FIGS. 1 and 3 the stator is in its normal or low angle position in which torque multiplication is low.

As seen in FIG. 1, a groove 66 is formed on the inner wall 53 of the annular hub casing in order to receive a stator piston stop ring 67, which limits the piston travel in the low angle direction. Travel of piston 57 toward the high angle position is limited by an abutment 65 formed on the interior of the stator hub casing. Thus, annular hub casing 48 and piston 57 together form a servo mechanism by which stator blades R may be rotated. In order to insure proper functioning of the stator servo 48—57, conventional oil seals 68 and 69 are provided.

It will be evident that the annular hub casing 48 may be constructed of any number of parts as may be advantageous in assembling the same with piston 57, shafts 51 and the crank ends 61 thereof.

The mechanism through which the axial movement of the stator piston 57 is controlled will now be described.

*Hydraulic control mechanism*

Referring again to FIG. 1, the inner wall of the stator servo casing has formed therein a radial passage 71 which registers with an annular channel in the surface of sleeve 19, which channel is in communication with radial passage 72 in stationary sleeve 19. The output side of oil pump 24 is connected to a pump output passage 73 which communicates with an annular servo supply passage 74 defined by stationary sleeve 19 and a circumferentially reduced portion 76 of the torque converter output shaft 15. Pump pressure of 100 p.s.i., for example, will be delivered through the oil passages 73—74—72—71 to that part of the servo chamber to the left of stator piston 57. Opposing the main line pressure force acting on the left side of piston 57 is the oil pressure within the converter which may be at approximately 60 p.s.i. The convertor oil pressure is delivered to the right side of piston 57 through an opening 77 in hub plate 52 and a passage 78 formed between the stator hub casing and the converter pump extension 18. It will, therefore, be seen that a differential pressure of 40 p.s.i. will move the stator piston to its right hand position as shown in FIGS. 1, 3 and 6, and thus maintain the stator in its low angle or low torque multiplying position under normal operating conditions.

Figure 5:
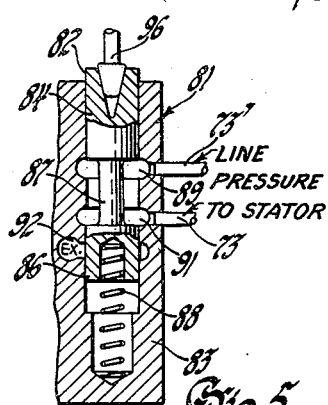
FIG. 5 is a detailed partial cross sectional view of the stator shift valve.

In order to shift the stator to the high torque multiplying position shown in FIGS. 4 and 6, a stator shift valve indicated generally at 81 is provided. Referring to FIGS. 5 and 6, it will be seen that valve 81 is interposed in the servo delivery circuit intermediate pump 24 and servo 48—57.

The shift valve includes a valve spindle 82 shiftable within a ported casing 83. The spindle 82 consists of lands 84 and 86 connected by a portion of reduced cross section 87. As is common in this type of valve, the cross section of the valve lands is generally coextensive with the cross sectional area of the casing bore. The spindle valve is normally biased by a spring 88, which fits within the bore of the casing 86, to its upper or low stator blade angle position, as shown in FIG. 5. With spindle 82 in its upper position of FIG. 5, oil from pump passage 73' is directed through casing port 89 around the reduced spindle section 87 out port 91 and into the servo supply passage 73 which delivers 100 p.s.i. oil to the servo as described above.

In the event the vehicle operator requires acceleration and hence torque multiplication in excess of that deliverable with the stator blading in the low angle position, the shift valve spindle 82 may be shifted to its lower position, against the force of spring 88. With spindle 82 in its lower position, land 84 covers supply port 89, while land 86 uncovers an exhaust port 92. Thus the oil pressure in the left side of servo 48—57 is dumped to exhaust. Converter oil pressure in the right side of servo will now shift the stator piston to the left position, as shown in dotted lines in FIG. 6, and in so doing, moves the stator blading into the high torque multiplying position of FIG. 4.

As noted above, the operator may in any conventional way manually shift valve spindle 82 to downshift the torque converter to achieve additional torque multiplication. Inasmuch as operator torque demand is normally reflected in the position of the engine accelerator pedal 93, it is preferred in the present device to shift valve spindle 82 through any suitable motion transmitting device, such as a linkage 97, FIG. 6, connected to the accelerator pedal and acting on spindle stem 96. It is obvious that the actuation of the stator control valve by the throttle linkage can be set to any degree of throttle opening desired for performance or efficiency.

While shift valve 81 may be actuated at any vehicle speed, it should be observed that above a certain speed, around 75 miles per hour, shifting the stator to the high angle position may result in slightly increased slip without any further torque multiplication, with a consequent slight loss of performance of the vehicle.

It will be noted in FIGS. 1 and 6 that the output line 73' from pump 24 has a branch converter feed passage 98 which delivers a continuous supply of oil to the torque converter in any well-known manner. It is also to be understood that in accordance with normal practice a pressure regulator valve 100, not shown in detail, is associated with the converter feed line to regulate the pressure of the oil within the torque converter at approximately 60 p.s.i. Oil discharged from the converter is shown as being directed to a sump from which the pump 24 draws oil. In accordance with conventional practice a heat exchanger (not shown) can be interposed between the converter outlet and the sump. Furthermore, if desired, the pressure regulator 100 may be connected in the outlet of the converter instead of in the inlet as shown in FIG. 6. The converter feed system is shown in FIG. 1 wherein a passage 98 communicates with a circumferentially reduced portion 99 of the output shaft 15 which through a radial passage 101 delivers converter feed oil to a longitudinal passage 102 in the output shaft. The oil from longitudinal passage 102 is fed through radial passage 103 to another circumferentially reduced portion of the output shaft 104 from whence the oil is delivered through and around the planetary gearing to the inside of the converter casing.

Shaft seals 106 and 107 are provided to seal off annular passages 104, 74 and 99, one from the other.

*Stator blade contour*

Although it is not necessary with the subject stator blading control mechanism, the shift of the blading between the low angle position and the high angle position can be facilitated by contouring and supporting the blading so that the fluid circulation within the converter normally tends to move the stator blades toward one position, either to the low angle or the high angle position, at all times or at certain operating speeds. It will be seen in FIGS. 3 and 4 that stator blade 47 has been so mounted on shaft 51 that the flow of fluid from T2 may strike the underside of the leading edge of the stator blading so as to tend to move the blades in a clockwise direction about shaft 51 toward the high torque multiplying position. The fluid flow force within the converter cannot in and of itself move the stator against the restraining action of the 40 p.s.i. differential force acting on the stator servo piston. It is apparent, however, that the converter flow force will supplement the converter pressure in moving the stator blading when the left side of the servo is exhausted in response to a demand for maximum torque multiplication. By so designing the stator blading, a quick and positive shift to the high angle position is assured. A different location of the shaft 51 in relation to the blade contour could be equally well utilized to supplement the forces tending to return the blades into low angle position if it were more convenient in relation to the operating forces of the control piston. It will be evident that the relation of the axis 51 to the nose or the leading edge of the blade 47 together with the spacing of the blades 47 will determine the effect of the fluid discharged by the second turbine 43 upon the stator blades. If the axis of rotation afforded by the shaft 51 is close to the nose of the blade 47, fluid will strike the surface of the blade 47 principally to the right of the axis tending to cause counterclockwise rotation of the blade 47. However, if the axis afforded by the shaft 51 is as remote as is shown in FIGURES 3 and 4, or even more remote from the nose of the blade 47 and if the blades 47 are properly spaced, then the fluid discharged by the blades 43 of the second turbine will be caused to strike the blades 47 principally to the left of the axis of rotation thereof tending to cause clockwise rotation of these blades. The spacing of the stator blades and the location of the pivotal points thereof can be determined by anyone skilled in the art to obtain the desired action.

*Converter operation with stator in high angle position*

The operation of the converter and related planetary gearing during normal operation has been generally described above. It is, therefore, only necessary to consider the effect of the shift of the stator to the high torque multiplying position in relation to the transmission of torque through the converter and gearing.

First, consider a high angle stator shift with the vehicle operating at normal speed and the converter in its coupling stage. Prior to shifting the stator blades in this case, T2 is transmitting all of the torque from P directly to the output shaft 15, and T1 and R are freewheeling in the direction of engine rotation. By depressing the accelerator to a predetermined position, the operator through shift valve 81 simultaneously cuts off main line pressure to the stator and exhausts the left side of the servo with the result that converter pressure assisted by fluid circulation within the converter shifts the stator blades to the high angle position. Fluid leaving T2 will no longer strike the back of the stator blading but instead will strike the front of the blades causing the one-way brake 49 to lock the stator against reverse rotation, which results in the fluid undergoing a maximum flow redirection. In moving the stators to the high angle position, not only is a torque multiplication obtained in the fluid converter, but also the planetary gearing again begins to multiply torque. With the throttle moved to wide open position and the stator blading redirecting fluid flow to supplement the driving effort, the increased fluid action speeds up T1 and there is once again a torque split through the converter with T1 transmitting torque along with T2. T1 continues to multiply torque, under these conditions, until the vehicle reaches a correspondingly higher speed, at which time torque transmission by T1 again dies out and it begins to free-wheel while the stator may stay in action until somewhat later.

Secondly, in starting from standstill, with the throttle depressed to operate the stator control valve, the power transmission gains appreciably from the high angle stator, resulting in better get-away and continued high performance as long as the throttle is depressed to hold the control valve down.

Thus, applicant has developed a new and improved type of fluid torque converter mechanism which is capable of a greater performance range than has been possible in heretofore known types of fluid torque converters. In addition, applicant has provided a high performance range type of torque converter in which the operator can positively control the selection of torque multiplying operating ranges within the converter.

While applicant has set forth a particular embodiment of his invention for purposes of illustration, it is apparent that many structural variations are possible within the scope of his teachings.

What I claim is:

1. A torque converter comprising an impeller, a turbine member, and a rotatable reaction member having pivotally mounted blading adjustable to a low exit angle and a high exit angle position with respect to the rotative axis of the torque converter, a first means tending to urge said blading to the high angle position, a second means biased to oppose said first means with force sufficient to move said blading to the low angle position, and a third means for rendering said second means ineffective to oppose said first means, said blading being contoured so that the fluid flow within said converter may act on said blading to supplement the action of said first means.

2. A power transmission mechanism including an input shaft, a regulator for controlling the speed of the input shaft, a torque converter comprising an impeller driven by said shaft, a turbine member, a rotatable reaction member having pivotally mounted blading adjustable to a low exit angle position or a high exit angle position relative to the rotative axis of the torque converter, said reaction member receiving fluid from said turbine member and redirecting said fluid into said impeller, a first fluid pressure means tending to urge said blading to the high angle position, a second fluid pressure means biased to oppose said first means with force sufficient to move said blading to the low angle position, and a third means controlled by said regulator to render said second means completely inoperative.

3. A torque converter comprising an impeller, a first turbine member, a second turbine member, and an adjustable rotatable stator element having a low exit angle position and a high exit angle position, a driving shaft connected to said impeller, an output shaft connected to one of said turbine members, a planetary gearset interposed between said first turbine member and output shafts, said gearset including a sun gear, a one-way brake mechanism adapted to brake said sun gear against reverse rotation relative to said impeller, an annulus gear driven by the first of said turbine members and a planet carrier drivingly connected to said second turbine member, a first means tending to urge said stator to the high angle position, a second means biased to oppose said first means with force sufficient to move said stator to the low angle position, and manually controlled means for rendering said second means ineffective to oppose said first means.

4. A torque converter comprising an impeller, a first turbine member, a second turbine member, and a rotatable stator element having blading adjustable to a low exit angle position and a high exit angle position, a driving shaft connected to said impeller, an output shaft connected to said second turbine member, a planetary gearset interposed between said first turbine member and output shaft, said gearset including a sun gear, a one-way brake mechanism adapted to brake said sun gear against reverse rotation relative to said impeller, an annulus gear driven by said first turbine member and a planet carrier drivingly connected to said second turbine member, a first means tending to urge said stator to the high angle position, a second means biased to oppose said first means with force sufficient to move said stator to the low angle position, and manually controlled means for rendering said second means ineffective to oppose said first means, said stator blading being so constructed and arranged that the fluid flow within said converter may act on said blading to supplement the action of said first means.

5. A fluid torque converter including an impeller member, a turbine member, and a rotatable stator member having adjustable blading, said stator member receiving fluid from said turbine member and redirecting said fluid into said impeller member, a power input shaft connected to said impeller, an output shaft drivingly connected to said turbine member, an annular stator hub concentrically disposed to said output shaft, said stator blading being pivotally mounted on said hub, a hydraulically actuated servo piston mounted within said hub and operably connected to said stator blading for moving said blading to a high exit or a low exit angle position with respect to the rotative axis of the torque converter, the leading edge of said stator blading being so formed in relation to its pivotal axis that the fluid entering said stator may tend to move said blading toward its high exit angle position.

6. A torque converter including an impeller, a turbine member, and a rotatable stator member having adjustable blading, a power input shaft connected to said impeller, an output shaft drivingly connected to said turbine member, an annular stator hub concentrically disposed about said output shaft, said stator hub having radially spaced longitudinally extending inner and outer walls, said outer wall having a plurality of radially extending openings formed therethrough, a stator blade shaft connected to a blade and rotatably supported within each of said hub openings, rotation of a blade shaft changing the angularity of the blade connected thereto, a longitudinally movable servo piston disposed within said hub between said inner and outer walls and connected to said stator blade shafts to rotate such shafts, and hydraulic means for longitudinally moving said servo whereby the stator blading may be moved to a plurality of angular positions.

7. A torque converter including an impeller, a turbine member, and a rotatable stator member having adjustable blading, a power input shaft connected to said impeller, an output shaft drivingly connected to said turbine member, an annular stator hub concentrically disposed about said output shaft, said stator hub having radially spaced longitudinally extending inner and outer walls, said outer wall having a plurality of radially extending openings formed therethrough, a stator blade shaft connected to a blade and rotatably supported within each of said hub openings, the radially inner end of said blade shaft being offset from the shaft axis to form a crank arm, a longitudinally movable servo piston mounted within said hub between said inner and outer walls, said crank arm being connected to said piston for movement therewith to rotate such shaft, hydraulic means for moving said piston in axially opposed directions within said hub causing said blade to be rotated to different angular positions relative to the rotative axis of the torque converter.

8. A power transmission mechanism having in combination a torque converter which includes a housing member, an impeller journalled for rotation within said housing, first and second turbine members, a rotatable stator member having adjustable blading movable from a low exit angle position to a high exit angle position with respect to the rotative axis of the torque converter, a power input shaft connected to said impeller, a power output shaft directly connected to one of said turbine members, a stationary support sleeve fixed to said housing and concentrically disposed relative to said output shaft, a planetary gearset intermediate said input and output shafts, said gearset including an annulus gear driven by one of said turbine members, a planet carrier connected to the other of said turbine members, a sun gear mounted upon said support sleeve, a plurality of planet pinions meshing with both said annulus and sun gears, and a one-way brake member intermediate said sun gear and said stationary sleeve to prevent reverse rotation of said sun gear relative to said impeller, an annular stator hub rotatably mounted on said support sleeve, a one-way brake mechanism intermediate said hub and said support sleeve to prevent the reverse rotation of said hub and stator with respect to said impeller, movable hydraulically actuated means disposed within said stator hub for shifting said stator blading to a plurality of angular positions, and control means for controlling movement of said movable means.

9. A power transmission mechanism having in combination an engine, a throttle member for controlling engine speed, an engine output shaft, a torque converter which includes a housing member, an impeller journalled for rotation within said housing and driven by said engine shaft, first and second turbine members, a rotatable stator member having adjustable blading movable from a low exit angle position to a high exit angle position with respect to the rotative axis of the torque converter, a converter output shaft directly connected to one of said turbine members, a stationary support sleeve fixed to said housing and concentrically disposed in relation to said output shaft, a planetary gearset intermediate said input and output shaft, said gearset including an annulus gear driven by one of said turbine members, a planet carrier connected to the other of said turbine members, a sun gear mounted upon said support sleeve, a plurality of planet gears meshing with both said annulus and sun gears, and a one-way brake member intermediate said sun gear and said stationary sleeve to prevent reverse rotation of said sun gear relative to said impeller, an annular stator hub rotatably mounted on said support sleeve, a one-way brake mechanism intermediate said hub and said support sleeve to prevent the reverse rotation of said hub and stator with respect to said impeller, a hydraulically actuated movable device disposed within said stator hub for shifting said stator blading to a plurality of angular positions, and means operatively connected to said throttle member for controlling movement of said movable device.

10. A power transmission mechanism having in combination a torque converter which includes a housing member, an impeller journalled for rotation within said housing, first and second turbine members, a rotatable stator member having adjustable blading movable from a low exit angle position to a high exit angle position with respect to the rotative axis of the torque converter, a power input shaft connected to said impeller; a power output shaft directly connected to one of said turbine members; a stationary support sleeve fixed to said housing and concentrically disposed relative to said output shaft; a planetary gearset intermediate said input and output shafts, said gearset including an annulus gear driven by one of said turbine members, a planet carrier connected to the other of said turbine members, a sun gear mounted upon said support sleeve, a plurality of planet pinions meshing with both said annulus and sun gears, and a one-way brake member intermediate said sun gear and said stationary sleeve to prevent reverse rotation of said sun gear relative to said impeller; an annular stator hub rotatively mounted on said support sleeve; a one-way brake mechanism intermediate said hub and said support sleeve to prevent the reverse rotation of said hub and stator with respect to said impeller; a shaft connected to and radially supporting each stator blade upon said hub for movement relative thereto; and hydraulically operated means disposed within said stator hub to coact with said blade shaft for shifting said stator blade to a plurality of torque multiplying positions, the stator blading being so constructed and arranged with respect to said stator blade support shaft and said shaft being so disposed within said stator that fluid flow within said converter may supplement said hydraulic control means in shifting said stator to one of said torque multiplying positions.

11. A power transmission mechanism having in combination a torque converter which includes a housing member, an impeller journalled for rotation within said housing, first and second turbine members, a rotatable stator member having blading movable to a high or a low torque multiplying position, a power input shaft connected to said impeller; a power output shaft directly connected to one of said turbine members, a stationary support sleeve fixed to said housing and concentrically disposed relative to said output shaft; a planetary gearset intermediate said input and output shafts, said gearset including an annulus gear driven by one of said turbine members, a planet carrier connected to the other of said turbine members, a sun gear mounted upon said support sleeve, a plurality of planet pinions meshing with both said annulus and sun gears, and a one-way brake member intermediate said sun gear and said stationary sleeve to prevent reverse rotation of said sun gear relative to said impeller; an annular stator hub rotatively mounted on said support sleeve; a one-way brake mechanism intermediate said hub and said support sleeve to prevent the reverse rotation of said hub and stator with respect to said impeller; a shaft for radially supporting each stator blade upon said hub for movement relative thereto, a servo piston mounted within said hub and operatively connected to said stator blade shafts, a first means coacting with said servo piston tending to urge said stator blading to the high torque multiplying position, a second means opposing said first means to move said piston to the low torque multiplying position and a manually controlled device for rendering said second means ineffective to oppose said first means.

12. A power transmission mechanism having in combination a torque converter which includes a housing member, an impeller journalled for rotation within said housing, first and second turbine members, a rotatable stator member intermediate said impeller and said second turbine member, said stator member having blading movable to a high and a low torque multiplying position, a power input shaft connected to said impeller; a power output shaft directly connected to one of said turbine members, a stationary support sleeve fixed to said housing and concentrically disposed relative to said output shaft; a planetary gearset intermediate said input and output shafts, said gearset including an annulus gear driven by said first turbine member, a planet carrier connected to said second turbine member, a sun gear mounted upon said support sleeve, a plurality of planet pinions meshing with both said annulus and sun gears, and a one-way brake member intermediate said sun gear and said stationary sleeve to prevent reverse rotation of said sun gear relative to said impeller; an annular stator hub rotatively mounted on said support sleeve; a one-way brake mechanism intermediate said hub and said support sleeve to prevent the reverse rotation of said hub and stator with respect to said impeller; a shaft for radially supporting said stator blading upon said hub for movement relative thereto, a hydraulically operated means disposed within said stator hub to coact with said shaft for shifting said blading to said high and low torque multiplying positions, the stator blading being so constructed and arranged with respect to said stator support shaft and said shaft being so disposed within said stator that fluid flow within said converter supplements said hydraulic control means in shifting said stator to one of said torque multiplying positions.

13. A power transmission mechanism having in combination a torque converter which includes a housing member, an impeller journalled for rotation within said housing, first and second turbine members, a stator member having adjustable blading, said impeller, first and second turbine members, and stator member circulating fluid in a circuit, a power input shaft connected to said impeller, a power output shaft directly connected to one of said turbine members, a stationary support sleeve fixed to said housing and concentrically disposed relative to said output shaft, a planetary gearset intermediate said input and output shafts, said gearset including an annulus gear driven by one of said turbine members, a planet carrier connected at the other of said turbine members, a sun gear mounted upon said support sleeve, a plurality of planet pinions meshing with both of said annulus and sun gears and a one-way brake member intermediate said sun gear and said stationary sleeve to prevent reverse rotation of said sun gear relative to said impeller, an annular stator hub member rotatably mounted upon said support sleeve, a one-way brake mechanism intermediate said hub and said support sleeve to prevent reverse rotation of said hub with respect to said impeller, a plurality of radial openings formed through the outer wall of said hub, a shaft rotatably supported in each of said radial openings and having shaft portions extending externally and internally of said hub, stator blading being rigidly secured to the external portion of said shaft, a longitudinally movable servo piston member mounted within said hub and connected to the internal end of said shaft, a first oil passage radially formed in said stator hub communicating with one side of said servo piston, a radial oil passage in said stationary sleeve registering with said first oil passage, a second oil passage in said stator hub connecting the opposite side of said servo piston with the torque converter fluid circuit, a hydraulic control system for actuating said servo piston and including a pump, an output passage in said housing leading from said pump, a fluid supply passage defined by said output shaft and said stator sleeve communicating at one end with said pump output passage, and at the other end with said support sleeve radial passage, a control valve interposed in said pump output passage intermediate said pump and said fluid supply passage, said valve having a first position permitting oil to flow from said pump output passage to said fluid supply passage to move said stator blading to a first torque multiplying station, said valve having a second position in which said fluid supply passage is opened to exhaust causing oil pressure from said torque converter circuit to move said stator blading to a second torque multiplying position.

14. A power transmission mechanism having in combination a torque converter which includes a housing member, an impeller journalled for rotation within said housing, a turbine member, a stator having adjustable blading, said impeller, turbine member and stator circulating fluid in a circuit, a power input shaft connected to said impeller, a power output shaft connected to said turbine member, a stationary support sleeve fixed to said housing and concentrically disposed relative to said output shaft, an annular stator hub member rotatably mounted upon said support sleeve, a one-way brake mechanism intermediate said hub and said support sleeve to prevent reverse rotation of said hub with respect to said impeller, a plurality of radial openings formed through the outer wall of said hub, a shaft rotatably supported in each of said radial openings and having shaft portions extending externally and internally of said hub, stator blading being rigidly secured to the external portion of said shaft, a longitudinally movable servo piston mounted within said hub and connected to the internal end of said shaft for rotating said blading, a first passage radially formed in said stator hub communicating with one side of said servo piston, a radial oil passage in said stationary sleeve registering with said first oil passage, a second oil passage in said stator hub connecting the opposite side of said servo piston with the torque converter fluid circuit, a hydraulic control system for actuating said servo piston and including a pump, an output passage in said housing leading from said pump, a fluid supply passage defined by said output shaft and said stator sleeve communicating at one end with said pump output passage and at the other end with said support sleeve radial passage, a control valve interposed in said pump output passage intermediate said pump and said fluid supply passage, said valve having a first position permitting oil to flow from said pump output passage to said fluid supply passage to move said stator blading to a first torque multiplying position, said valve having a second position in which said fluid supply passage is opened to exhaust causing oil pressure from said torque converter circuit to move said stator blade to a second torque multiplying position.

15. A torque converter including an impeller, a turbine member, and a rotatable stator member having adjustable blades, a power input shaft connected to said impeller, an output shaft drivingly connected to said turbine member, an annular hub supporting the blades and concentrically disposed about said output shaft, said hub having radially spaced axially extending inner and outer walls, an axially movable annular piston between the walls and forming with the walls an expansible chamber, said outer wall having a plurality of radially extending openings formed therethrough, a blade shaft connected to a blade and rotatably supported within each of said hub openings so that rotation of a blade shaft changes the angular position of the blade connected thereto with respect to a plane passing through the axis of rotation of the stator, the piston being connected to said blade shafts to rotate such shafts by axial movement thereof, hydraulic means for controlling the longitudinal movement of said piston whereby the stator blades may be moved to a plurality of angular positions.

16. A torque converter comprising an impeller, a turbine member, and a rotatable reaction member having pivotally mounted blading adjustable to a low angle and a high angle position with respect to the rotative axis of the torque converter, a first means tending to urge said blading to the high angle position, a second means biased to oppose said first means with force sufficient to move said blading to the low angle position, and a third means for rendering said second means ineffective to oppose said first means.

References Cited in the file of this patent
UNITED STATES PATENTS

| | | |
|---|---|---|
| 2,186,025 | Jandasek | Jan. 9, 1940 |
| 2,190,830 | Dodge | Feb. 20, 1940 |
| 2,203,177 | Patterson | June 4, 1940 |
| 2,205,794 | Jandasek | June 25, 1940 |
| 2,292,482 | Roche | Aug. 11, 1942 |
| 2,298,649 | Russell | Oct. 13, 1942 |
| 2,326,655 | Jandasek | Aug. 10, 1943 |
| 2,327,647 | Jandasek | Aug. 24, 1943 |
| 2,333,253 | Jandasek | Nov. 2, 1943 |
| 2,570,889 | Van Lammeren | Oct. 9, 1951 |
| 2,602,353 | Keller | July 8, 1952 |
| 2,612,755 | Sczczenowski | Oct. 7, 1952 |
| 2,616,309 | Russell | Nov. 4, 1952 |
| 2,707,887 | Slack | May 10, 1955 |

FOREIGN PATENTS

| | | |
|---|---|---|
| 425,538 | Great Britain | Mar. 18, 1935 |
| 1,002,800 | France | Nov. 7, 1951 |
| 1,044,901 | France | June 24, 1953 |

UNITED STATES PATENT OFFICE
CERTIFICATE OF CORRECTION

Patent No. 2,999,400                          September 12, 1961

Oliver K. Kelley

It is hereby certified that error appears in the above numbered patent requiring correction and that the said Letters Patent should read as corrected below.

Column 1, line 18, after "phase" insert -- to a coupling phase. In the torque multiplying phase --; line 26, for "multiples" read -- multiplies --.

Signed and sealed this 10th day of April 1962.

(SEAL)
Attest:

ERNEST W. SWIDER                          DAVID L. LADD

Attesting Officer                            Commissioner of Patents